No. 846,102. PATENTED MAR. 5, 1907.
R. L. FRINK.
METHOD AND APPARATUS FOR DRAWING GLASS.
APPLICATION FILED AUG. 29, 1906.

3 SHEETS—SHEET 3.

WITNESSES.
INVENTOR.

UNITED STATES PATENT OFFICE.

ROBERT L. FRINK, OF NEW CASTLE, PENNSYLVANIA.

METHOD AND APPARATUS FOR DRAWING GLASS.

No. 846,102.   Specification of Letters Patent.   Patented March 5, 1907.

Application filed August 29, 1906. Serial No. 332,498.

*To all whom it may concern:*

Be it known that I, ROBERT L. FRINK, a resident of New Castle, in the county of Lawrence and State of Pennsylvania, have invented a new and useful Improvement in Methods and Apparatus for Drawing Glass; and I do hereby declare the following to be a full, clear, and exact description thereof.

My invention relates to a new and useful method of and apparatus for drawing glass, of which the following is a full, clear, and exact description, reference being had to the accompanying drawings, forming part of this specification, in which—

Figure 1:
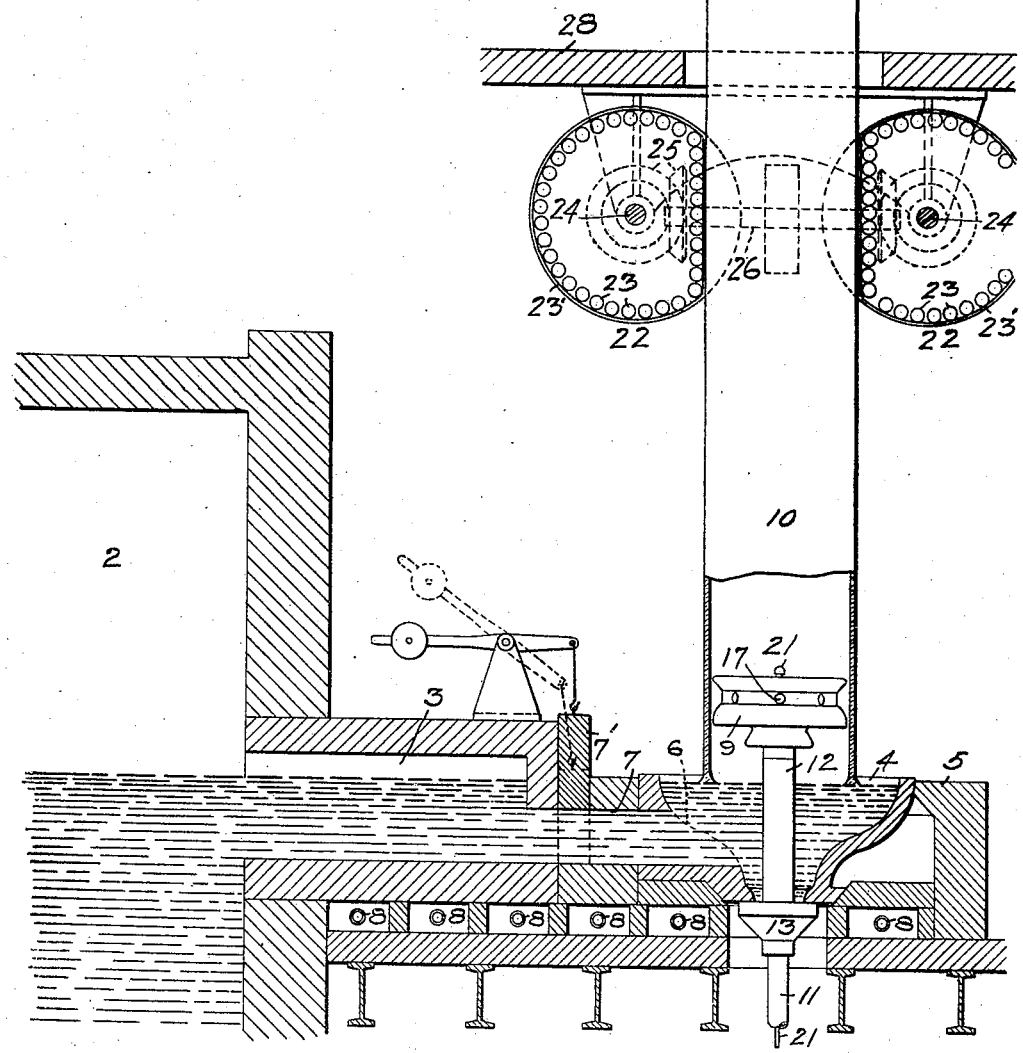
Figure 2:
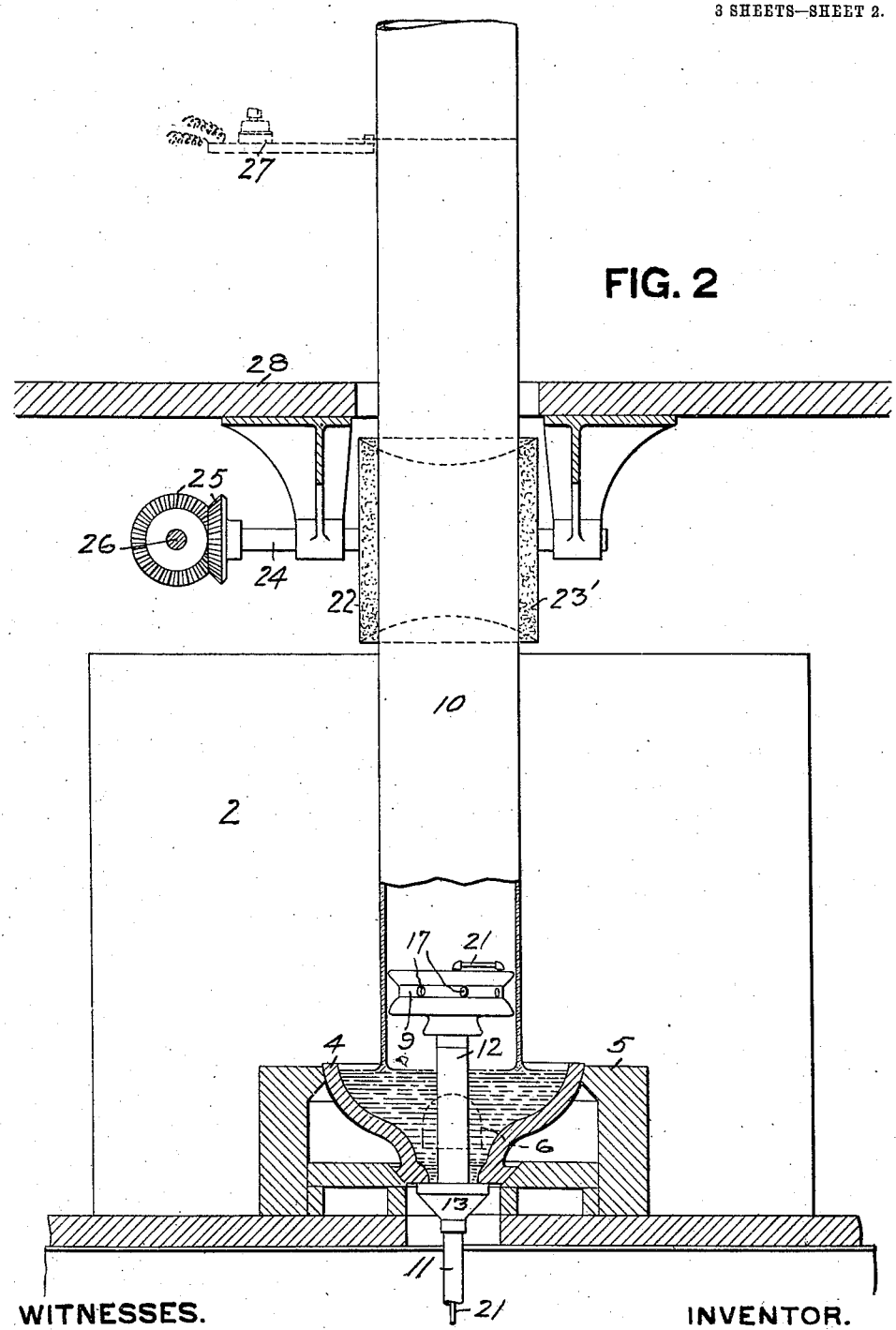
Figure 3:
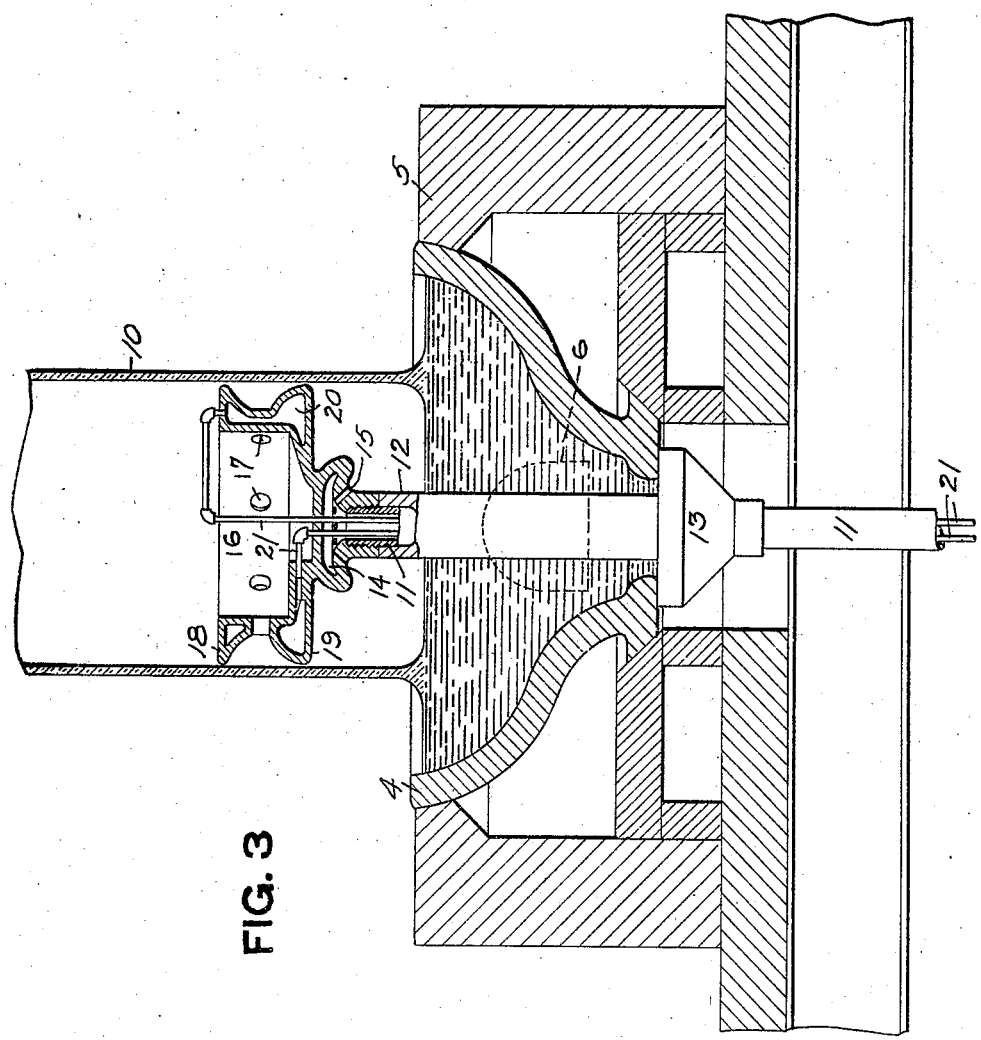

Figures 1 and 2 are sectional elevations taken in planes at right angles to each other and illustrating my invention and one manner of carrying the same into practice; and Fig. 3 is a vertical section, on an enlarged scale, showing the drawing-pot and the cooling and blowing head.

My invention has relation to drawing glass cylinders or other hollow glass articles. Heretofore it has been the practice in drawing glass articles of this character to draw them in separate predetermined lengths, one length being drawn, a new supply of glass then being taken, and another length drawn. In this operation considerable time is lost between the separate operations by reason of the time required to stop and start the drawing operations and to provide the new supply of glass.

The object of my present invention is to provide a method and means whereby the drawing of glass cylinders and other hollow glass articles may be carried on continuously, the drawn cylinder or other article being severed into sections of the desired lengths as it is drawn.

My invention consists, broadly, in providing the drawing pot or vessel with a continuous supply of glass, drawing therefrom a continuous cylinder or other hollow article, and severing the same into lengths as it is drawn.

It also consists in the novel means for carrying this method into practice; also, in means for regulating the air-pressure applied to the interior of the hollow object while it is being drawn and in connection therewith for cooling the air supplied.

My invention also consists in the novel steps and combination of steps and in the novel construction, arrangement, and combination of parts, all substantially as hereinafter described, and pointed out in the appended claims.

I have shown and have herein described one form of apparatus by means of which my invention can be carried into practice; but it will be obvious to those skilled in the art that various forms and arrangements of apparatus may be employed within the spirit and scope of my invention.

In the accompanying drawings the numeral 2 designates a glass-melting furnace of any suitable character having a "dog-house" 3.

4 is a drawing-pot or vessel, which is set in a suitable casing 5, forming an extension of the dog-house, and having an opening 6 at one side which communicates by a passage or conduit 7 with the interior of the dog-house, whereby there is maintained in the drawing pot or vessel a continuous supply of molten glass. This passage or conduit 7 is provided with a gate 7', operated in any suitable manner for opening or closing the same and when closed permits of the drawing of a cylinder of definite length and stops the flow of molten glass into the drawing pot or vessel 4 and allows the drawing of said pot.

8 designates a series of burners by means of which the glass in the dog-house, the conduit 7, and the drawing pot or vessel may be maintained at the proper drawing temperature.

9 designates an air regulating and cooling head, around which the hollow glass cylinder 10 is drawn. This head is carried by an air-supply pipe 11, which extends upwardly through the drawing pot or vessel, being surrounded therein by a protecting-sleeve 12, of refractory material.

13 is a block or stop which closes the opening in the bottom of the drawing pot or vessel around said sleeve.

The air regulating and cooling head 9 is formed with a lower air-chamber 14, into which the pipe 11 opens at its upper end and the bottom wall of which is provided with a series of downwardly and outwardly directed perforations 15. The upper portion of the head 9 contains a chamber 16, which is open at the top and whose lateral wall is provided with a series of perforations 17, the latter extending outwardly between upper and lower flanges 18 and 19 of the head, the flange 18 being located at the setting-point of the glass and being slightly larger in diameter than the lower flange 19. The chamber 16 is surrounded by an annular chamber 20, through which a cooling medium, such as water, is circulated by means of the pipes 21, which extend upwardly through the air-pipe 11.

The glass cylinder 10 may be drawn upwardly by a variety of means. In the drawings I have shown for this purpose a pair of gripping-rolls 22, whose peripheral surfaces are formed by a wire fabric 23 of spring character, having a cover 23', of asbestos or similar refractory material. These rolls are carried by shafts 24 and are positively driven by means of gear-wheels 25 on a shaft 26, as indicated in Figs. 1 and 2.

27 designates any suitable means for severing the glass cylinder into lengths after it has been drawn upwardly between the rolls 22. This device is indicated in the drawing as being an electrical hand-tool of the form described and claimed in the patent of H. W. Hitner, No. 821,361, dated May 22, 1906. The specific means for severing the cylinder into lengths forms, however, no part of my present invention, and any well-known or suitable device may be employed for this purpose.

The operation is as follows: In starting the drawing operation a ring-bait of suitable forming character to pass the head 9 is engaged with the glass in the drawing-pot and is drawn upwardly by any suitable means until a sufficient length has been drawn to bring the cylinder to the action of the gripping-rolls 22. The drawing is continued by means of these rolls, the flexible surfaces of which adapt themselves to the cylinder in the manner indicated in Fig. 1. As the cylinder is drawn above the floor 28 it is severed into successive lengths by a severing device, such as indicated at 27, and when drawn a required length the gate 7' is closed and drawing-pot drained. During the operation air is supplied to the head 9. This air escapes by means of the perforations 15 into the space within the glass cylinder below the lower flange of the head. If the pressure in this space becomes too great, the cylinder 10 is distended somewhat, thereby permitting the more free escape of the air around the edge of the flange 19 into the space between the flanges 18 and 19 and then through perforations 17 into the chamber 16 and thence upwardly within the cylinder. If, on the other hand, the pressure becomes too low, the cylinder 10 will more closely hug the lower flange 19 of the head, causing an accumulation and increase of pressure in the space below the head. In this manner an effective automatic regulation is provided by the action of the air itself upon the cylinder being drawn in connection with the head. As a result the cylinder will be of comparatively uniform diameter, since it is not possible to trap or completely confine the air, and the excess of air escapes with only a slight enlargement of the cylinder. The head and the cylinder in combination act as an automatic regulating-valve for the air-pressure. The air in passing upwardly through the pipe 11 and through and around the head is cooled to the proper degree to chill and set the glass at the inside of the cylinder, thereby preventing cracking due to unequal cooling of the interior and exterior portions and also preventing the glass from curling or lapping when the cylinder-sections are split for flattening.

In prior apparatus for drawing hollow glass articles the length and also the diameter or size of the article being drawn has been limited, due to the fact that the drawing strain has been applied at the end of the cylinder or other article—that is, to the bait. In drawing by such methods after the cylinder or other article has reached a certain length the glass at the upper end thereof has cooled to such an extent that it will no longer adhere to the bait, or, in other words, the tensile strength of the glass at point of adhesion to the bait is no longer sufficient to sustain the weight of the long cylinder. With large cylinders the weight thereof soon was sufficient to break the same from the bait. As a result the prior methods of drawing have been limited to cylinders of definite length and small size. By my method, however, the point of application of the drawing strain—namely, by means of the rolls 22—is constantly changed, so that there is always a substantially uniform length of cylinder between said drawing means and the bath. This obviously enables the production of cylinders of indefinite length and diameter. Furthermore, the weakness due to the connection of the glass to the bait is entirely avoided in my process, since the drawing means engages directly with the cylinder, so that very large and heavy cylinders can be drawn in indefinite lengths equally as well as those of smaller diameter.

The advantages of my invention will be apparent to those skilled in the art. The continuous drawing effects a large saving in time and greatly increases the output. The automatic regulation of the air overcomes the difficulties of regulation heretofore experienced and secures the production of a continuous cylinder of uniform size and quality.

I claim—

1. The method of drawing hollow glass articles, which consists in drawing a hollow glass body of indefinite length from a molten bath in a manner to maintain a substantially fixed distance between the bath and point of application of the drawing strain, and supplying air to the interior of said hollow body during the drawing.

2. The method of drawing hollow glass articles, which consists in drawing a hollow glass cylinder of indefinite length from a molten bath, progressively changing the point of application of the drawing strain to said cylinder, and supplying air to the interior of the cylinder during the drawing.

3. The method of drawing hollow glass articles, which consists in drawing a hollow glass cylinder of indefinite length from a molten bath, progressively changing the point of application of the drawing strain to said cylinder, supplying air to the interior of the cylinder during the drawing, and then severing the cylinder into lengths.

4. The method of drawing hollow glass articles, which consists in drawing a continuous cylinder of indefinite length from a bath of molten glass, applying heat to the bath during the drawing operation, supplying air to the interior of the cylinder, and cooling the air thus supplied; substantially as described.

5. The method of drawing hollow glass articles, which consists in drawing a continuous cylinder of indefinite length from a bath of molten glass, applying heat to the bath during the drawing operation, supplying air to the interior of the cylinder, cooling the air thus supplied, and then severing the drawn cylinder into lengths; substantially as described.

6. The method of regulating the pressure of air or other gaseous fluid supplied to the interior of hollow glass articles while drawing the same, which consists in introducing the air or other fluid into a partially-confined space within such article, and controlling the escape of the fluid by its action on the walls of the article; substantially as described.

7. The method of regulating the pressure of air or other gaseous fluid supplied to the interior of hollow glass articles, while being drawn, which consists in introducing the fluid into a confined space within such article and causing the article itself under the action of the fluid to regulate the escape of the fluid from such space; substantially as described.

8. In drawing hollow glass articles, the method of regulating the air-supply to the interior of the article being drawn, which consists in introducing the air to the article below the point where the glass sets, and utilizing its action upon the article to control its escape; substantially as described.

9. The method of drawing hollow glass articles, which consists in drawing a hollow body from a molten bath, and introducing air therein and confining the same below the point at which the glass sets, whereby said air is caused to distend the unset glass body and thereby automatically regulate its pressure.

10. In apparatus for drawing glass, a drawing pot or receptacle, a head around which the hollow glass article is drawn, said head being of a size to substantially close the hollow article, and means for drawing a hollow article of indefinite length around said head, said drawing means being arranged to progressively change its point of grip on the hollow article.

11. In glass-drawing apparatus, a drawing pot or receptacle, a head around which the hollow glass article is drawn, said head being of a size to substantially close the hollow article, and means for automatically regulating the pressure between said head and bath.

12. In glass-drawing apparatus, a drawing pot or receptacle, a head around which the hollow glass article is drawn, said head being of a size to substantially close the hollow article and serving as a means for regulating the pressure between itself and the bath, and means for producing between said head and the bath a pressure different from atmospheric pressure.

13. In glass-drawing apparatus, a drawing pot or receptacle, a head around which the hollow glass article is drawn, said head being of a size to substantially close the hollow article, and an air-inlet opening between said head and bath.

14. In glass-drawing apparatus, a drawing pot or receptacle, means for drawing therefrom a continuous cylinder of indefinite length, said drawing means being arranged to progressively change its point of grip on said cylinder, and means for supplying air to the interior of the cylinder during the drawing operation.

15. In apparatus for drawing glass, a drawing pot or receptacle, means for drawing therefrom a continuous cylinder of glass of indefinite length, said drawing means being arranged to progressively change its point of grip on the cylinder, means for supplying air to the interior of the cylinder during the drawing operation, and means for severing the cylinder above the drawing means.

16. In apparatus for drawing glass, a glass pot or receptacle, means for maintaining a supply of glass in said receptacle, drawing devices for drawing a continuous cylinder from the glass in the receptacle, and means for supplying air to the interior of the cylinder arranged in combination with the cylinder to automatically regulate the pressure of the air-supply; substantially as described.

17. In glass-drawing apparatus, a drawing pot or receptacle, a head around which the hollow glass article is drawn, said head being of a size to substantially close the hollow article and being located in such proximity to the bath that the glass will still be plastic when it passes said head, and means for supplying air between said head and bath.

18. In glass-drawing apparatus, a drawing pot or receptacle, a head around which a hollow glass article is drawn, said head being of a size to substantially close the hollow article and being located in such proximity to the bath that the glass will not be set when it passes the head, and means for supplying air to the head and introducing the same between said head and the bath.

19. In glass-drawing apparatus, a drawing pot or receptacle, a head around which a hollow glass article is drawn, said head having two parts and being of a size to substantially close the hollow article at two points and being located in such proximity to the bath that the glass will not be set when it passes the head, means for supplying air between the lower part of the head and the bath, and means for the escapement of air from between the two parts of the head.

20. In glass-drawing apparatus, a head around which a hollow glass article is arranged to be drawn, said head having flanges one of which is substantially the diameter of the article to be drawn, and the other of which is of slightly less diameter, and means for supplying air to the interior of the article being drawn below said head, the head having means intermediate of the two flanges to permit the escape of air-pressure; substantially as described.

21. In glass-drawing apparatus, an air supply and regulating head to which a hollow glass article is adapted to be drawn, said head having an upper flange of substantially the diameter of the article being drawn, and a lower flange slightly less in diameter, means for supplying air to the interior of the glass article below the head, the said head having means for the escape of air-pressure between the two flanges, and means for cooling the air; substantially as described.

22. In glass-drawing apparatus, an air regulating and cooling head about which a hollow glass article is adapted to be drawn, means for supplying air to the interior of the head, and to permit the escape therefrom into the article being drawn below the head, means for permitting the escape of air from below the head, and means for circulating a cooling medium in the head; substantially as described.

23. In apparatus for drawing hollow glass articles, a drawing-roll having a periphery supported at the ends and yielding between the ends and adapted to yieldingly grip the article being drawn.

24. In apparatus for drawing hollow glass articles, a pair of drawing-rolls arranged upon opposite sides of the article to be drawn and having peripheries supported at the ends and yielding between the ends.

25. In apparatus for drawing hollow glass articles, a pair of drawing-rolls arranged upon opposite sides of the article to be drawn, said rolls being provided with yielding peripheries supported at their ends only, and a flexible refractory covering for said yielding peripheries.

26. In a glass-drawing apparatus, a drawing-roll having its periphery of wire fabric of spring character, and a refractory covering; substantially as described.

In testimony whereof I, the said ROBERT L. FRINK, have hereunto set my hand.

ROBERT L. FRINK.

Witnesses:
ROBERT C. TOTTEN,
J. R. KELLER.